UNITED STATES PATENT OFFICE.

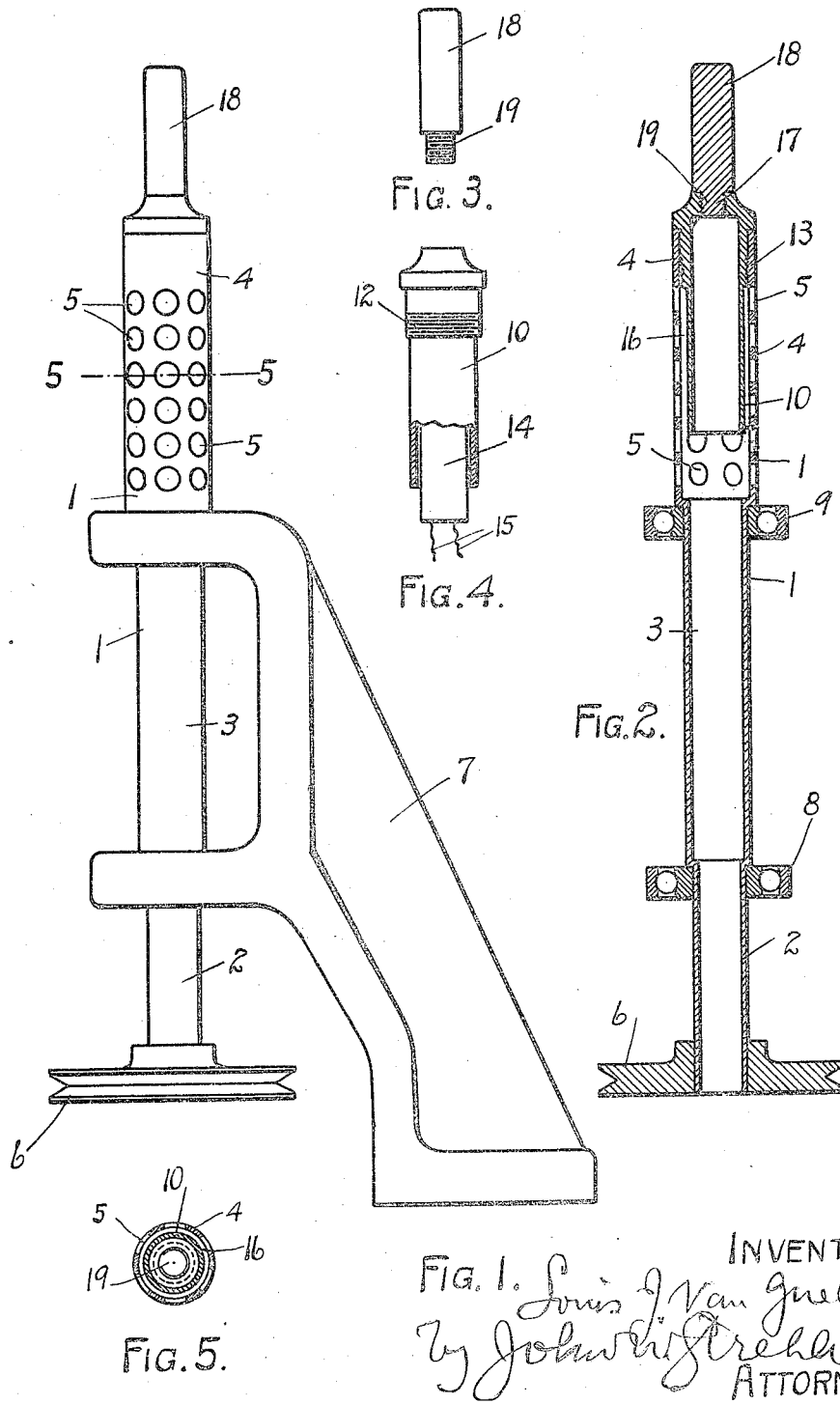

LOUIS J. VAN GUELPEN, OF CINCINNATI, OHIO.

BURNISHING TOOL.

1,423,052.     Specification of Letters Patent.     Patented July 18, 1922.

Application filed February 18, 1919, Serial No. 277,861. Renewed February 15, 1922. Serial No. 536,817.

*To all whom it may concern:*

Be it known that I, LOUIS J. VAN GUELPEN, a citizen of the United States, residing at the city of Cincinnati, in the county of Hamilton and State of Ohio, have invented certain new and useful Improvements in Burnishing Tools, of which the following is a specification.

My invention belongs to that class of burnishing tools which are formed of a revolving heated spindle, combined with a burnishing element. It is so formed and combined with a tool carrier or holder, that the burnishing element can be removed therefrom and replaced, or other burnishing elements or tool parts can be used and removed at will.

By means of a heating unit, the burnishing part or tool itself can be heated readily and quickly, without heating the spindle itself. By using my invention, burnishing elements or tools can be changed almost instantly for different classes of work.

The tool is revolved at high speed and better work can be done by the use of a rotary motion, and it can be more easily operated.

The tool is compact, unique, simple and highly efficient.

Its various features and advantages will readily become apparent from the following description and claims.

In the accompany drawing forming a part of this specification:

Fig. 1, is a view in elevation of my invention,

Fig. 2, is a central longitudinal section,

Fig. 3, is view in elevation of one form of tool used by me.

Fig. 4, is a view in elevation of the tool and heating unit holder, partly broken away to show the unit, and Fig. 5, is a cross-section on line 5—5 of Fig. 1.

My invention consists of a spindle carrying a burnishing tool at its upper extremity. This spindle is formed as a cylindrical sleeve or tube 1, narrowed at its lower part 2 and having a section 3 as it passes upward, and, at the top part is materially widened to form a section 4, provided with holes 5. The parts or sections 2, 3 and 4 are preferably made integral, but can be otherwise formed.

At the lower part of the spindle I place the driving pulley 6. The tool is supported in bracket 7 throughout the medium of ball bearing parts 8 and 9.

In the section 4 of the spindle 1, I place the tool and unit holder 10. This tool and unit holder is cylindrical in form and sets into the said section 4 from the top, its screw threads 13 at top of the section 4. The unit is marked 14 and is of the electric form and has terminal wires 15.

An air space or passage 16, is provided between the tool holder 10 and section 4 to all of the passages of air through the spindle and through holes 5, to keep the spindle cool.

At the extreme top end the section 4 of spindle 1, is narrowed and carries an interior screw thread 17. The tool is marked 18 and carries a screw threaded part 19, which screws into the screw threads 17 at top of spindle 1.

I have only shown one form of tool 18 which form is used for burnishing certain kinds of work in leather or other material. This tool 18 may be of any other size, shape or contour; as for example, it may be round like a wheel or octagonal in shape, or it may be provided with a groove or have a pointed end, and it may be connected to the spindle in any manner desired, and best adapted for the work. It will be readily seen that by using my improved spindle in connection with tools which can be changed and detached from the spindle, I am enabled to burnish different kinds of work; as for example, I can use tools for burnishing the edges of shoe soles, or shoe heels, or toe caps, shoe bodies, or various other parts which make up a shoe or boot or any other article used separately or in connection with some article of manufacture, which is made of leather or other material which must be burnished, and for these reasons I do not wish to limit myself to the exact form of burnishing tool herein shown and described, as the same is capable of considerable change and modification without departing from the spirit and principle of the invention and I claim that such modifications will still fall within the scope of my invention.

What I claim as new and my invention, and desire to secure by Letters Patent is:

1. In a burnishing tool of the class described, a revoluble spindle, a tool carrier, said tool carrier situated in said spindle, a removable tool capable of being attached to said tool carrier, and a heating unit also carried by said tool carrier.

2. In a burnishing tool of the class described, a revoluble spindle, a tool carrier, said tool carrier situated in said spindle, a removable tool capable of being attached to said tool carrier, and a heating unit also carried by said tool carrier, said tool carrier surrounded by a sleeve provided with perforations.

3. In a burnishing tool of the class described, a revoluble spindle, a burnishing element, and a tool holder, said burnishing element removably connected to said tool holder.

4. In a burnishing tool of the class described, a hollow spindle provided with a perforated sleeve at one end, a tool holder in said hollow sleeve, a detachable burnishing tool connected to said tool holder and a heating unit in said tool holder.

5. In a burnishing tool of the class described, a spindle, a burnishing element, a tool and holder, said spindle perforated and carrying the tool holder, the spindle and tool holder spaced apart, said burnishing element capable of being detached from said tool holder.

6. In a burnishing tool of the class described, a revoluble spindle, a burnishing element, and a tool holder, spaced in part from said spindle, said burnishing element removably connected to said tool holder.

7. In a burnishing tool of the class described, a revoluble spindle, a burnishing element, and a tool holder, said tool holder removably connected to said spindle, and said burnishing element removably connected to said tool holder.

In testimony whereof I affix my signature at Cincinnati, Ohio, this 17th day of February, 1919.

LOUIS J. VAN GUELPEN.